United States Patent

[11] 3,542,018

[72] Inventors Kenneth C. Quick
826 Walnut St.;
Kenneth F. Weir, 836 Elm St., Webster City, Iowa 50595
[21] Appl. No. 752,596
[22] Filed Aug. 14, 1968
[45] Patented Nov. 24, 1970

[54] VENT SAFETY SWITCH FOR HEATING SYSTEMS
2 Claims, 6 Drawing Figs.
[52] U.S. Cl. .................................................. 126/116, 431/20
[51] Int. Cl. .................................................. F24h 3/06, F24h 9/20
[50] Field of Search .......................................... 126/110, 116; 431/20

[56] References Cited
UNITED STATES PATENTS
| | | | |
|---|---|---|---|
| 2,112,554 | 3/1938 | Beam ........................... | 431/20 |
| 2,184,983 | 12/1939 | Tornquist ..................... | 431/20 |
| 2,884,048 | 4/1959 | Marble et al. ................ | 126/110 |
| 3,403,962 | 10/1968 | Suffron et al. ............... | 431/20 |

Primary Examiner—Charles J. Myhre
Attorney—Zarley, McKee and Thomte

ABSTRACT: A vent safety switch for gas-fired heating systems adapted to interrupt the gas supply to the gas burner when the temperature in the air vent chamber rises to a predetermined level. The switch is placed in the air vent chamber which is in communication with the heating system chimney. The switch is electrically connected to the gas valve and is adapted to close the gas valve when the temperature rises to the said predetermined level. The switch has a manual reset provided thereon which must be manually operated to cause the switch to be closed thereby opening the gas valve.

Patented Nov. 24, 1970

3,542,018

INVENTORS
KENNETH C. QUICK
KENNETH F. WEIR
BY
Zarley, McKee & Thomte
ATTORNEYS

VENT SAFETY SWITCH FOR HEATING SYSTEMS

A blocked flue is obviously extremely hazardous in gas-fired heating systems. The continued operation of the heating system with a blocked flue can result in carbon monoxide spreading throughout the building. Conventional gas-fired, forced air heating systems utilize a limit control switch means which will shut off the gas supply valve when the temperature in the heat exchanger becomes too high as a result of the blower fan failing to operate. However, the limit control switch means will again open the gas valve when the furnace cools off thereby again creating the safety hazard. Some gas-fired heating systems are also provided with a pilot safety which closes the gas valve if the pilot light goes out. Neither the limit control switch means or the pilot safety will safely react to a blocked flue or an extreme downdraft condition to positively close the gas valve until the hazardous condition has been remedied.

Therefore, it is a principal object of this invention to provide a vent safety switch for gas-fired heating systems.

A further object of this invention is to provide a vent safety switch for gas-fired heating systems which closes the gas supply valve when the temperature in the vent reaches a predetermined level.

A further object of this invention is to provide a vent safety switch for gas-fired heating systems having a manual reset means associated therewith.

A further object of this invention is to provide a vent safety switch for gas-fired heating systems which positively closes the gas valve until a manual reset has been operated.

A further object of this invention is to provide a vent safety switch for gas-fired heating systems which reacts to blocked flues and extreme downdraft conditions.

A further object of this invention is to provide a vent safety switch for gas-fired heating systems which is efficient, easy to install, safe and trouble-free.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 3:
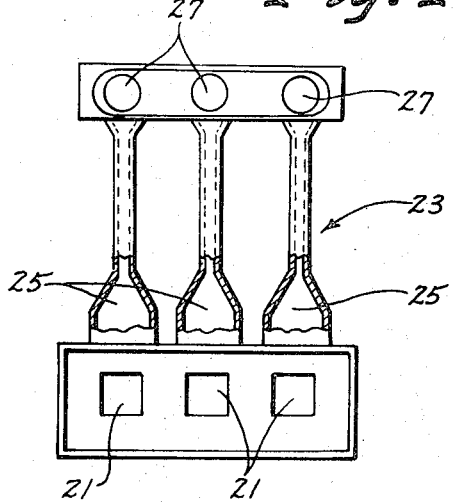
FIG. 3 is a partial elevational view of the heat exchanger portion of the heating system with portions thereof cut away.

The numeral 10 generally designates a gas-fired heating system including a cabinet 11. A blower 13 is provided in the lower portion of the cabinet 11 and is driven by a motor 15. The numeral 17 generally designates a plurality of gas burners which are connected to a gas pipe 19. Each of the gas burners 17 extend into an opening 21 in a heat exchanger which is generally designated by the reference numeral 23. The gases created by the combustion of the gas in burners 17 passes upwardly through the chambers 25 of heat exchanger 23 and outwardly through openings 27 as illustrated in FIG. 3. A flue 29 extends from the upper portion of the cabinet 11 and is in communication with the chamber 31 in the cabinet 11 which is in communication with the openings 27. Cabinet 11 is provided with an air vent means 33 formed therein which permits the flow of air into the cabinet 11 from the area surrounding the same. The numeral 35 generally designates a plate which extends downwardly from the upper portion of cabinet 11 in chamber 31 upon which the vent safety switch 37 is operatively mounted.

Figure 6:
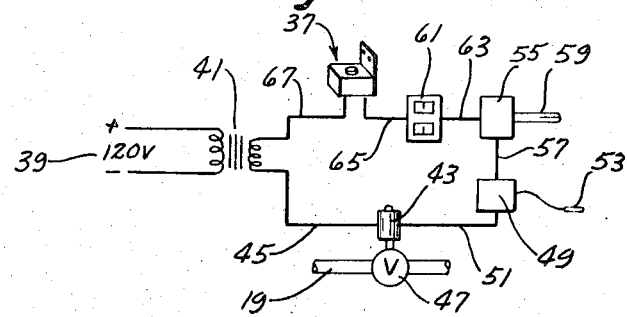
FIG. 6 is a schematic view of the electrical circuitry of this invention.

With respect to FIG. 6, the numeral 39 generally designates a source of electrical power such as 120 volt alternating current and which is connected to a transformer 41 which reduces the voltage to approximately 24 volts. Transformer 41 is connected to a solenoid 43 by a lead 45. Solenoid 43 when energized maintains the gas valve 47 in an open condition to permit the flow of gas through the pipe 19 to the burners 17. When solenoid 43 is deenergized, the gas valve 47 becomes closed. Solenoid 43 is connected to a conventional pilot safety 49 by a lead 51. Pilot safety 49 includes a thermal couple 53 which is positioned adjacent the pilot light of the gas burners and operates in conventional fashion. Pilot safety 49 is connected to the heating system limit control 55 by a lead 57. Limit control 55 includes a temperature sensing element 59 which extends inwardly adjacent the heat exchanger 23. Limit control 55 is connected to a thermostat 61 by a lead 63. Thermostat 61 is connected to one terminal of the vent safety switch 37 by a lead 65. A second terminal of the switch 37 is connected to the other side of the transformer 41 by a lead 67.

Figure 1:
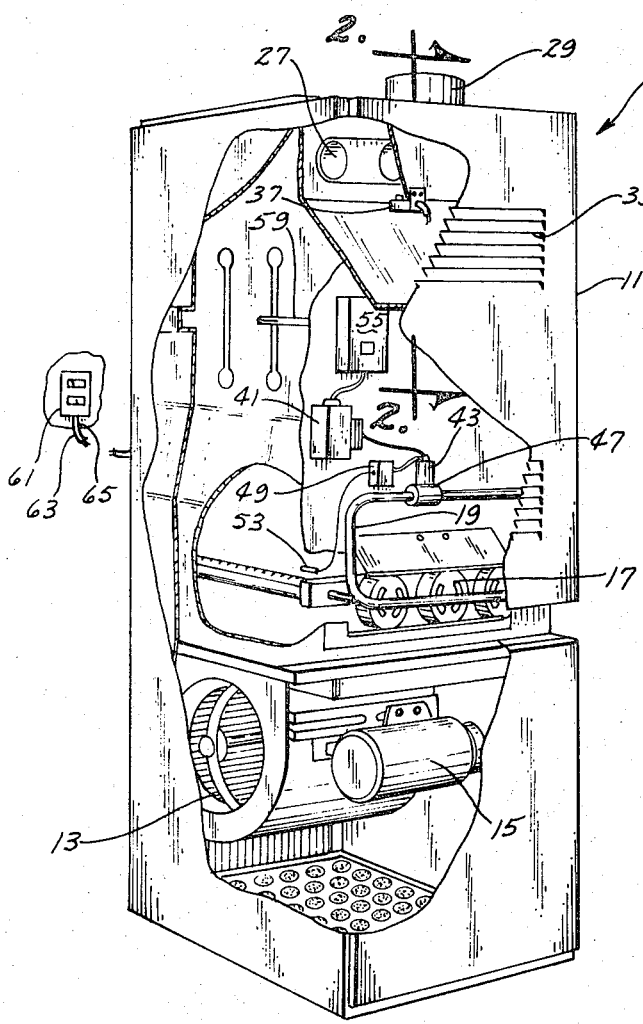
FIG. 1 is a partial perspective view of a gas-fired heating system with portions thereof cut away to more fully illustrate the invention.
Figure 2:
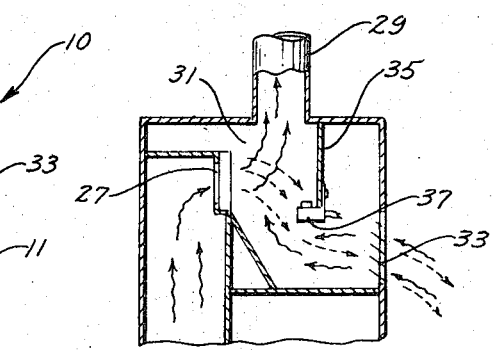
FIG. 2 is a fragmentary sectional view as seen along lines 2-2 of FIG. 1.
Figure 4:
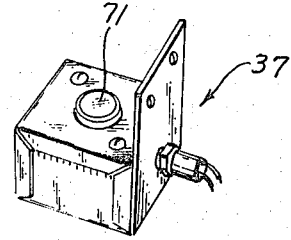
FIG. 4 is a perspective view of the vent safety switch.
Figure 5:
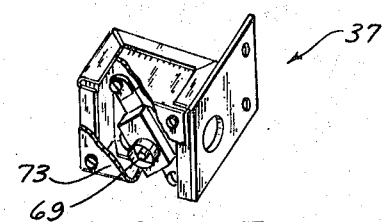
FIG. 5 is a perspective view of the switch of FIG. 4 with a portion thereof cut away to illustrate the reset button.

The vent safety switch 37 is normally closed and is temperature sensitive so as to become open at a predetermined temperature. The switch 37 is preferably set to open at 160°F. for installation such as illustrated in FIG. 1. The switch 37 is manufactured by the Thermo-O-Disc Company, Mansfield, Ohio and includes a manual reset button 69 which must be operated manually to close the switch once the same has become opened by being subjected to the predetermined temperature which in this case is 160°F. The switch 37 includes a temperature sensitive switch disc 71 which protrudes from the upper surface thereof as illustrated in FIG. 4. The reset button 69 can only be operated upon the removal of the cover 73 from the switch 37.

In operation, the switch 37 is normally closed and is wired in series with the gas valve solenoid 43 and the other controls. When the heating system is operating in proper fashion, the gas valve 47 will remain open to supply gas to the burner 17. The flue gases pass upwardly through the chambers 25, through openings 27, into chamber 31 and upwardly through the flue 29. The air supply for the flue 29 enters the cabinet 11 through the vent 33 and is at room temperature. If the flue 29 becomes blocked, the hot gases build up in the compartment 31 and expose the switch 37 to the increased temperature. When the temperature adjacent the switch 37 reaches 160°, the switch opens thereby breaking the electrical circuit to the solenoid 43 which causes the gas valve 47 to close. The closing of the gas valve 47 obviously causes the burner 17 to be extinguished thereby eliminating further flue gases from being generated. The fact that the burners 17 are extinguished will soon become apparent to the occupants of the building and will indicate to them that the heating system has malfunctioned. The gas valve 47 can only be opened by manually operating the reset button 69 on the switch 37. Thus, the person resetting the switch 37 will be aware that conditions have existed which caused the temperature in the vicinity of the switch to rise to the 160° level. With such knowledge in mind, the person will obviously correct the conditions which existed to cause the switch to be opened.

While the foregoing description has been directed generally to a gas-fired heating system of the forced air type, it should be noted that the switch 37 can be used for all types of heating systems. The switch 37 may be used on gas heaters where no current is used by simply installing a thermal couple adapter between the thermal couple terminal end and the electro magnet safety power unit.

Thus it can be seen that a unique vent safety switch has been provided which positively closes the gas valve upon the flue becoming plugged. The fact that the switch 37 must be manually reset insures that the person will be advised of the malfunction of the furnace.

Although the vent safety switch 37 has been described as being mounted in the compartment 31 of the heating system illustrated in the drawings, it should be noted that the switch may be installed in other locations for other types of heating systems. For example, the switch could be installed in I vent hoods, vertical draft hoods and conventional draft hoods (compartment 31).

Thus it can be seen that the device accomplishes at least all of its stated objectives.

Some changes may be made in the construction and arrangement of our VENT SAFETY SWITCH FOR HEATING SYSTEMS without departing from the real spirit and purpose of our invention, and it is our intention to cover by our claims, any modified forms of structure or use of mechanical equivalents which may be reasonably included within their scope.

We claim:

1. In a heating system:
   a cabinet;
   a heater means in said cabinet having a gas-fired burner means connected to a source of gas;
   a first control means operatively connected to said source of gas adapted to interrupt the flow of gas to said burner means at times;
   a flue means in communication with said burner means and extending from said cabinet;
   said cabinet having an air intake vent means formed therein for permitting the flow of air into said cabinet from the area surrounding the same;
   a compartment in said cabinet in between said air intake vent means and said flue means, the temperature in said compartment normally being at approximately the same temperature as the area surrounding said cabinet;
   a temperature responsive switch means in said compartment, said switch means being normally closed;
   said switch means opening and causing said first control means to interrupt the flow of gas to said burner means when said switch means is subjected to a predetermined temperature in said compartment; and
   said switch means having a manual reset means which is adapted to move said switch means to its closed position only when manually operated.

2. The system of claim 5 wherein said first control means includes a solenoid operated gas valve, said switch means being electrically connected to a source of electrical energy and being series connected to said solenoid, said switch means opening when the temperature in said compartment reaches approximately 160°F. to cause said solenoid to interrupt the flow of said gas to said burner means.